United States Patent [19]

Scott

[11] 4,244,221
[45] Jan. 13, 1981

[54] REMOVABLE INSTRUMENTATION PROBE

[75] Inventor: John C. Scott, Cincinnati, Ohio

[73] Assignee: General Electric Company, Cincinnati, Ohio

[21] Appl. No.: 8,359

[22] Filed: Feb. 1, 1979

[51] Int. Cl.³ .............................................. G01K 1/08
[52] U.S. Cl. .................................. 73/349; 73/343 R; 324/158 P
[58] Field of Search ....................... 73/349, 357, 343 R

[56] References Cited

U.S. PATENT DOCUMENTS

| | | | |
|---|---|---|---|
| 1,162,929 | 7/1979 | Finney | 73/343 R X |
| 1,447,968 | 3/1923 | Davis | 73/349 X |
| 1,649,487 | 11/1927 | Riebe et al. | 15/104.09 |
| 1,821,832 | 9/1931 | Goerg et al. | 73/351 |
| 2,558,570 | 6/1951 | Lamb | 73/349 |
| 2,946,221 | 7/1960 | Annear et al. | 73/212 |
| 3,167,960 | 2/1976 | Miesiak | 73/349 |
| 3,296,864 | 1/1967 | Kealy et al. | 73/339 R |
| 3,653,976 | 4/1972 | Miller | 136/231 |
| 3,845,661 | 11/1974 | Hollweck et al. | 73/349 X |
| 3,940,988 | 3/1976 | Reed | 73/349 |
| 4,015,475 | 4/1977 | Pluschkell | 73/343 R |

*Primary Examiner*—Daniel M. Yasich
*Attorney, Agent, or Firm*—Carl L. Silverman; Derek P. Lawrence

[57] ABSTRACT

A removable instrumentation probe comprising a hollow member, preferably generally cylindrical, which extends through an opening in a wall. The member includes a band which projects outwardly from the member and is comprised of a plurality of circumferentially spaced apart tapered or curved segments which engage the interior of the wall opening to facilitate assembly and removal of the probe.

7 Claims, 4 Drawing Figures

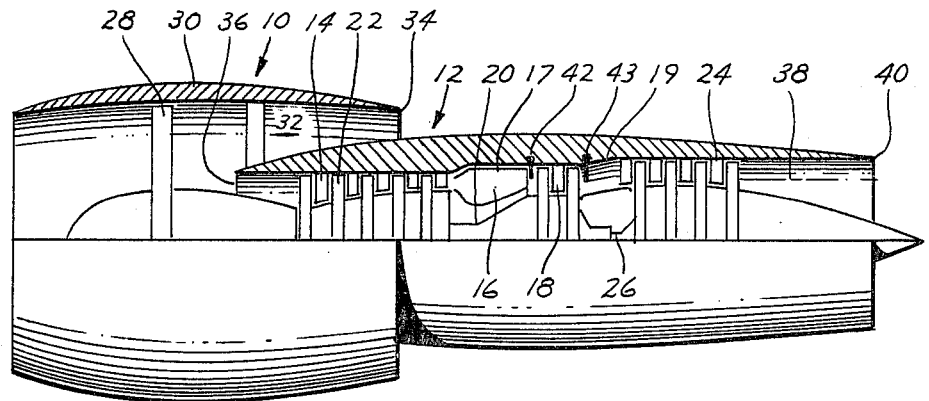
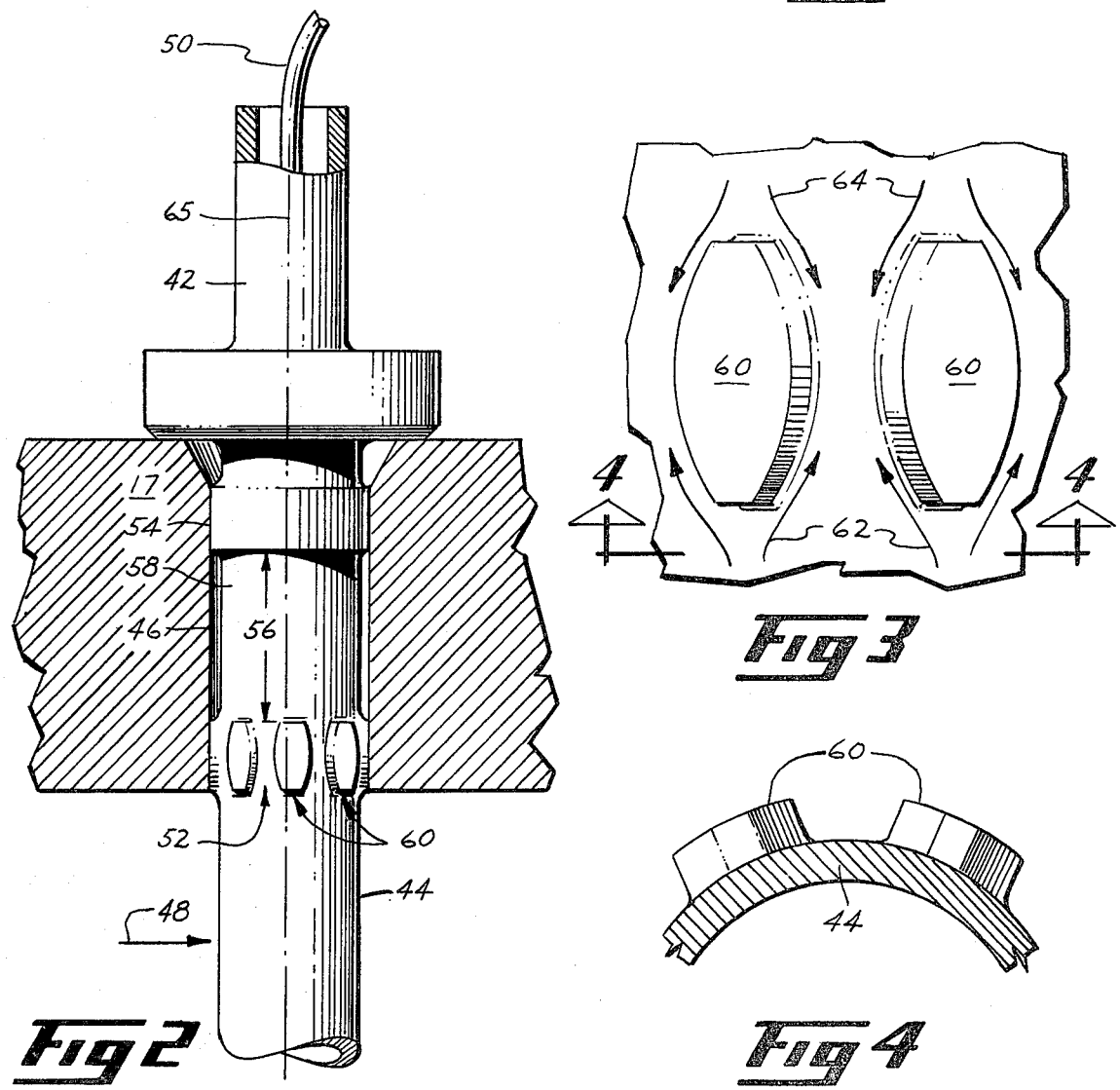

REMOVABLE INSTRUMENTATION PROBE

BACKGROUND OF THE INVENTION

1. Field of the Invention

This invention relates generally to instrumentation probes and, more particularly, to a removable instrumentation probe.

2. Description of the Prior Art

A removable instrumentation probe for measuring properties, for example temperatures and pressures, must have a close mechanical fit of a sliding nature. Such a close fit is necessary in order to provide proper alignment between the probe and the adjacent components as well as to minimize leakage around the probe. When such an instrumentation probe having a close mechanical fit is utilized in conjunction with a hostile environment, as for example to measure the temperature or pressure of the high temperature gas flow associated with the combustor or high pressure turbine areas of a gas turbine engine, surface contamination problems could result in seizure, thereby diminishing the ability to satisfactorily assemble or remove the probe from the engine.

The prior art solution to this problem has been to provide additional clearances, such as unequal taper diameters in mating parts, thereby sacrificing the objective of a close fit.

SUMMARY OF THE INVENTION

It is therefore an object of the present invention to provide a removable instrumentation probe which maintains the advantage of a close mechanical fit.

It is another object of the present invention to provide such a probe which may be utilized to measure properties in a hostile environment without detracting from its ease of removability and assembly.

Briefly stated, these objects, as well as additional objects and advantages which will become apparent from the following specification and the appended drawings and claims, are accomplished by the present invention which provides a removable instrumentation probe comprising a hollow member, preferably generally cylindrical, which extends through an opening in a wall. The member includes spaced apart first and second bands which project outwardly from the member and engage the interior of the wall opening. The first band is comprised of a plurality of circumferentially spaced apart individual segments. Each of the segments are tapered on both of their longitudinal ends.

BRIEF DESCRIPTION OF THE DRAWING

FIG. 1 is a schematic, cross-sectional view of a typical gas turbine engine which includes the preferred embodiment of the instrumentation probe of the present invention.

FIG. 2 is an enlarged elevation view (partially in section) of the preferred embodiment of the present invention.

FIG. 3 is an enlarged projectional view of a portion of FIG. 2.

FIG. 4 is a view of FIG. 3 taken along lines 4—4.

DESCRIPTION OF THE PREFERRED EMBODIMENT

Referring to the drawing, wherein like numerals correspond to like elements throughout, reference is first directed to FIG. 1 wherein a typical gas turbine engine, shown generally as 10, is depicted as including in one form, the present invention. The engine 10 is comprised of a core engine or core 12 which includes in serial flow relationship, an axial flow compressor 14, a combustor 16 partially defined by a casing 17 and a high pressure turbine 18 including a casing 19. The high pressure turbine 18 is drivingly connected to the compressor 14 by a shaft 20 and a core rotor 22. The engine 10 is also comprised of a low pressure system, which includes a low pressure turbine 24 which is drivingly connected by a low pressure shaft 26 to a fan assembly 28. An outer nacelle 30 is spaced apart from the core engine 12 to define a bypass duct 32 therebetween.

In operation, air enters the engine 10 and is initially compressed by the fan assembly 28. A first portion of this compressed fan air enters the bypass duct 32 and is subsequently discharged through a fan bypass nozzle 34 to provide a first propulsive force. The remaining portion of the compressed fan air enters an inlet 36, is further compressed by the compressor 14 and is discharged into the combustor 16 where it is burned with fuel to provide high temperature combustion gases. The combustion gases pass through and drive the high pressure turbine 18 which, in turn, drives the compressor 14. The combustion gases subsequently pass through and drive the low pressure turbine 24 which, in turn, drives the fan 28. The combustion gases then pass along an exhaust flow path 38 whereupon they are discharged from a core exhaust nozzle 40 thereby providing a second propulsive force.

The foregoing description is typical of a present-day turbofan engine; however, as will become apparent from the following description, the present invention may also be employed in conjunction with any other type of gas turbine engine, for example a turboprop, turbojet, turboshaft, etc. The above description of the turbofan engine depicted in FIG. 1 is, therefore, merely meant to be illustrative of one such application of the present invention.

The present invention is a removable instrumentation probe 42 which is depicted in highly simplified schematic form in its preferred embodiment in FIG. 1 as a combustor gas temperature sensor probe. It should be understood, however, that this is not intended to be a limitation on the present invention which may be utilized to measure other properties, for example pressures, or may be employed in other locations throughout the engine 10, for example, as a high pressure turbine pressure sensor probe 43, also shown in highly simplified schematic form in FIG. 1. In addition, the present invention may be utilized to measure properties in conjunction with any suitable application other than with gas turbine engines.

As may be best seen in FIG. 2, the probe 42, in one embodiment, is comprised of a generally cylindrical hollow member 44 which extends through a generally circular opening 46 in the combustor casing 17 and into the high temperature combustor gas flow path 48. The hollow interior of the cylindrical member 44 may contain one or more temperature sensing thermocouples (not shown) which provide an indication of the temperature of the combustor gas to another part of the engine 10, for example an engine fuel control (not shown). The temperature indication may be provided in the form of an electrical signal which may be sent to the fuel control along one or more electrical lines or wires, (one of which is shown as 50) which extend from the probe 42.

The cylindrical member 44 includes first and second enlarged diameter bands 52 and 54 respectively which are longitudinally spaced apart a distance 56 and project outwardly from and are disposed peripherally around the member 44. (As used herein, longitudinally refers to up and down, parallel to probe axis 65 as shown on FIG. 2.). The outer diameters of the enlarged bands 52 and 54 are slightly less than that of the casing opening 46 so that they engage the interior of the casing opening 46 with a close mechanical fit to provide proper alignment of the probe 42 as well as to minimize gas leakage. The radially outer surfaces of the bands 52 and 54 may be provided with a wear coating, for example chrome carbide with nichrome (not shown) in order to prevent any loss of close fit due to surface wear of the mating parts. For purposes which will hereinafter become more apparent, a portion 58 of the cylindrical member 44 located between the enlarged bands 52 and 54 may have a diameter which is slightly less than that of the rest of the cylindrical member 44.

The first enlarged diameter band 52 is comprised of a plurality of circumferentially spaced apart individual segments 60. As will be best seen in FIGS. 3 and 4, each band segment 60 is reduced in width or tapered on both longitudinal ends and is generally elliptically shaped.

During the insertion of the probe 42 into the casing opening 46, any debris, such as carbon, oxides or other combustion-related contamination which has accumulated within the casing opening 46, is swept along the tapered extremities of the enlarged band segments 60 (as shown by flow arrows 62 in FIG. 3), passes through the spaces between the segments 60 and can be accumulated in the reduced diameter portion 58. In a similar manner, during the removal of the probe 42 any such contamination which has accumulated within the casing opening 46 is swept along the tapered extremities of the enlarged band segments 60 (as shown by flow arrows 64 in FIG. 3). Thus, both the insertion and removal of the probe 42 may be accomplished without contamination causing parts seizure.

From the foregoing description it can be seen that the present invention comprises a removable instrumentation probe which has the advantage of a close mechanical fit while maintaining its ease of removability and assembly when utilized to measure properties in a hostile environment. It will be recognized by one skilled in the art that changes may be made to the above-described invention without departing from the broad inventive concepts thereof. It is to be understood, therefore, that this invention is not limited to the particular embodiment disclosed, but it is intended to cover all modifications which are within the spirit and the scope of the invention as set forth in the appended claims.

What is claimed is:

1. A removable instrumentation probe comprising a hollow member having a longitudinal axis and extending through an opening in a wall for measuring properties within an inner side of the opening in the wall, wherein the improvement comprises:
   first and second bands projecting outwardly from and disposed peripherally around the member, said bands being longitudinally spaced apart and engaging the interior of said wall opening with a close mechanical fit to minimize gas leakage between the member and the interior of said wall opening, said second band being sealingly located between said first band and an outer side of said wall, the first band being farthest from the outer side of the wall and being comprised of a plurality of circumferentially spaced apart individual segments, each of said band segments being reduced in width on both longitudinal ends for sweeping away contamination on said interior of said wall opening wherein insertion and removal of the member through the wall opening can be accomplished without seizure caused by said contamination.

2. The instrumentation probe as recited in claim 1 wherein the segments are generally elliptically shaped.

3. The instrumentation probe as recited in claim 1 wherein the outer surface of the bands includes a wear coating.

4. In a gas turbine engine including a gas flow path partially defined by a casing, a removable instrumentation probe for measuring properties within the gas flow path, the probe comprising a generally cylindrical hollow member having a longitudinal axis and extending into the gas flow path through an opening in the casing, wherein the improvement comprises:
   first and second enlarged diameter bands around the cylindrical member, said bands being longitudinally spaced apart and engaging the interior of said casing opening with a close mechanical fit to minimize gas leakage between the cylindrical member and the interior of said casing opening, said second band being sealingly located between said first band and the exterior of said casing opening, the first enlarged band being closest to the gas flow path and being comprised of a plurality of circumferentially spaced apart individual segments, each of said segments being reduced in width on both longitudinal ends for sweeping away contamination on said interior of said casing opening wherein insertion and removal of the member through the opening in the casing can be accomplished without seizure caused by said contamination.

5. The instrumentation probe as recited in claim 4 in which the engine includes a turbine section wherein the gas flow path is located in said turbine section.

6. The instrumentation probe as recited in claim 4 in which the engine includes a combustor section wherein the gas flow path is located in said combustor section.

7. A removable instrumentation probe comprising a hollow member having a longitudinal axis for extending through an opening in a wall for measuring properties on the inner side of the wall, wherein the improvement comprises:
   first and second bands projecting outwardly from and disposed peripherally around the member, said bands being longitudinally spaced apart and engaging the interior of said wall opening with a close mechanical fit to minimize gas leakage between the member and the interior of said wall opening, said second band being sealingly located between said first band and an outer side of said wall, the first band being farthest from the outer side of the wall and being comprised of a plurality of circumferentially spaced apart individual segments, each of said band segments being reduced in width on both longitudinal ends and being generally elliptically shaped.

* * * * *